US010120656B1

United States Patent
Singh et al.

(10) Patent No.: US 10,120,656 B1
(45) Date of Patent: Nov. 6, 2018

(54) ROBOTIC PROCESS AUTOMATION SYSTEM FOR FUNCTIONAL EVALUATION AND IMPROVEMENT OF BACK END INSTRUCTIONAL CONSTRUCTS

(71) Applicant: Bank of America Corporation, Charlotte, NC (US)

(72) Inventors: Awadhesh Pratap Singh, Hyderabad (IN); Samson Paulraj, Hyderabad (IN); Suki Ramasamy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/805,303

(22) Filed: Nov. 7, 2017

(51) Int. Cl.
| *G06F 9/44* | (2018.01) |
| *G06F 8/33* | (2018.01) |
| *G06F 17/30* | (2006.01) |
| *G05B 19/042* | (2006.01) |
| *G06F 11/36* | (2006.01) |

(52) U.S. Cl.
CPC ............ *G06F 8/33* (2013.01); *G05B 19/042* (2013.01); *G06F 11/3616* (2013.01); *G06F 17/30985* (2013.01); *G05B 2219/50391* (2013.01)

(58) Field of Classification Search
CPC ....................................................... G06F 9/44
USPC ................................................. 717/110–115
See application file for complete search history.

(56) References Cited

U.S. PATENT DOCUMENTS

| 5,627,981 | A | 5/1997 | Adler et al. |
| 5,628,016 | A | 5/1997 | Kukol |
| 5,799,179 | A | 8/1998 | Ebcioglu et al. |
| 5,901,308 | A | 5/1999 | Cohn et al. |
| 5,923,863 | A | 7/1999 | Adler et al. |
| 6,081,665 | A | 6/2000 | Nilsen et al. |
| 6,301,705 | B1 | 10/2001 | Doshi et al. |
| 6,487,716 | B1 * | 11/2002 | Choi ...................... G06F 8/443 712/244 |
| 7,401,323 | B2 | 7/2008 | Stall et al. |
| 7,607,066 | B2 | 10/2009 | Gertz et al. |
| 8,407,670 | B2 | 3/2013 | Hegde et al. |
| 8,438,392 | B2 | 5/2013 | Oxford |
| 8,705,082 | B2 * | 4/2014 | Nakamoto .......... G06F 11/1433 358/1.12 |
| 9,201,646 | B2 | 12/2015 | Balachandran |
| 9,383,973 | B2 | 7/2016 | Villar et al. |
| 9,460,077 | B1 | 10/2016 | Casey |
| 9,555,544 | B2 | 1/2017 | Bataller et al. |
| 9,600,244 | B1 | 3/2017 | Hwang et al. |

(Continued)

*Primary Examiner* — Jae Jeon
(74) *Attorney, Agent, or Firm* — Michael A. Springs; Moore & Van Allen PLLC; Nicholas C. Russell

(57) ABSTRACT

Embodiments of the present invention provide a system for the utilization of a robotic process automation system for functional evaluation and improvement of back end instructional constructs. The system may scan a set of code to identify an exception comprising an exception tag and an exception string located at a first location within the set of code. The system may then transmit the set of code and the identified exception to a robotic process automation system, along with instructions for the robotic process automation system to compare the exception tag and exception string to a replacement code database to identify an exception string. The robotic process automation system can then replace the exception string in the set of code with the identified replacement string.

20 Claims, 7 Drawing Sheets

(56) References Cited

U.S. PATENT DOCUMENTS

| | | |
|---|---|---|
| 9,632,771 B2 | 4/2017 | Toub |
| 9,665,467 B2 | 5/2017 | Angwin et al. |
| 9,721,095 B2 * | 8/2017 | Levine-Fraiman ..... G06F 21/56 |
| 2008/0282229 A1 * | 11/2008 | Kim ..................... G06F 9/454 |
| | | 717/124 |
| 2013/0238902 A1 | 9/2013 | Oxford |
| 2016/0117150 A1 | 4/2016 | Kizhakkevalappil et al. |

* cited by examiner

ROBOTIC PROCESS AUTOMATION SYSTEM FOR FUNCTIONAL EVALUATION AND IMPROVEMENT OF BACK END INSTRUCTIONAL CONSTRUCTS

BACKGROUND

Exceptions and inefficiencies in sets of code must be identified and resolved before they can enter production. The exceptions and their solutions are difficult to resolve manually, particularly when the author of the set of code is different from the person tasked with reviewing or fixing the exceptions. Utilizing a robotic process automation system to identify and resolve the exceptions bypasses the inefficiencies of manual intervention.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for the utilization of a robotic process automation system for functional evaluation and improvement of back end instructional constructs. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve receiving a set of code and scanning the set of code for one or more exceptions. The system may then identify, from the scan, an exception of the one or more exceptions, wherein the exception comprises an exception tag and an exception string located at a first location within the set of code. In response to identifying the exception in the code, the system may transmit the set of code and the identified exception to a robotic process automation system. In some embodiments, this robotic process automation system may compare the exception tag and the exception string to a replacement code database to identify a replacement string, remove the exception string from the set of code at the first location, and insert the replacement string into the set of code at the first location.

In some embodiments of the system, comparing the exception tag and the exception string to the replacement code database comprises querying a relational database of known exception tags or known exception strings and paired known replacement code for each of the known exception tags or known exception strings.

Additionally or alternatively, in some embodiments of the system, comparing the exception tag and the exception string to the replacement code database comprises processing the exception tag as an input to identify the replacement string through a search of a knowledge base associated with a programming language associated with the set of code.

Furthermore, in some embodiments of the system, comparing the exception tag and the exception string to the replacement code database comprises trawling online forums associated with a programming language associated with the set of code over an Internet system to identify the replacement string associated with the exception tag and the exception string.

The system may, in some embodiments, additionally perform the steps of receiving, from the robotic process automation system, the set of code with the inserted replacement string and, in response to receiving the set of code with the inserted replacement string, scan the set of code with the inserted replacement string for new exceptions. In some such embodiments, the system may additionally determine that no new exceptions are present in the set of code with the inserted replacement string and store the set of code with the inserted replacement string in a production database. The system can then transmit, to a computing device of a user, an indication that the set of code with the inserted replacement string is in condition to enter production. In other such embodiments, the system may determine that a new exception is present in the set of code with the inserted replacement string and, in response to determining that a new exception is present in the set of code with the inserted replacement string, transmit, to a computing device of a user, an indication that the set of code with the inserted replacement string is not in condition to enter production.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
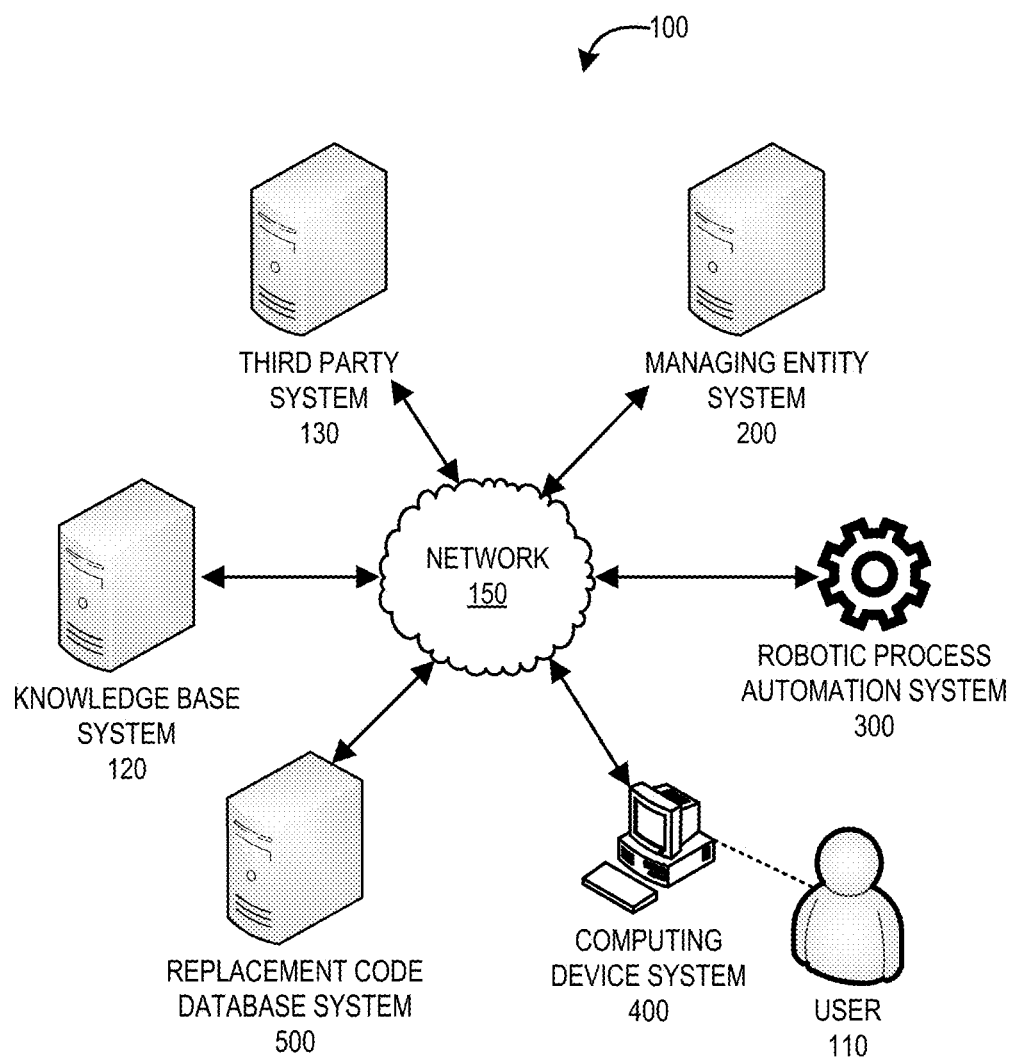
Figure 2:
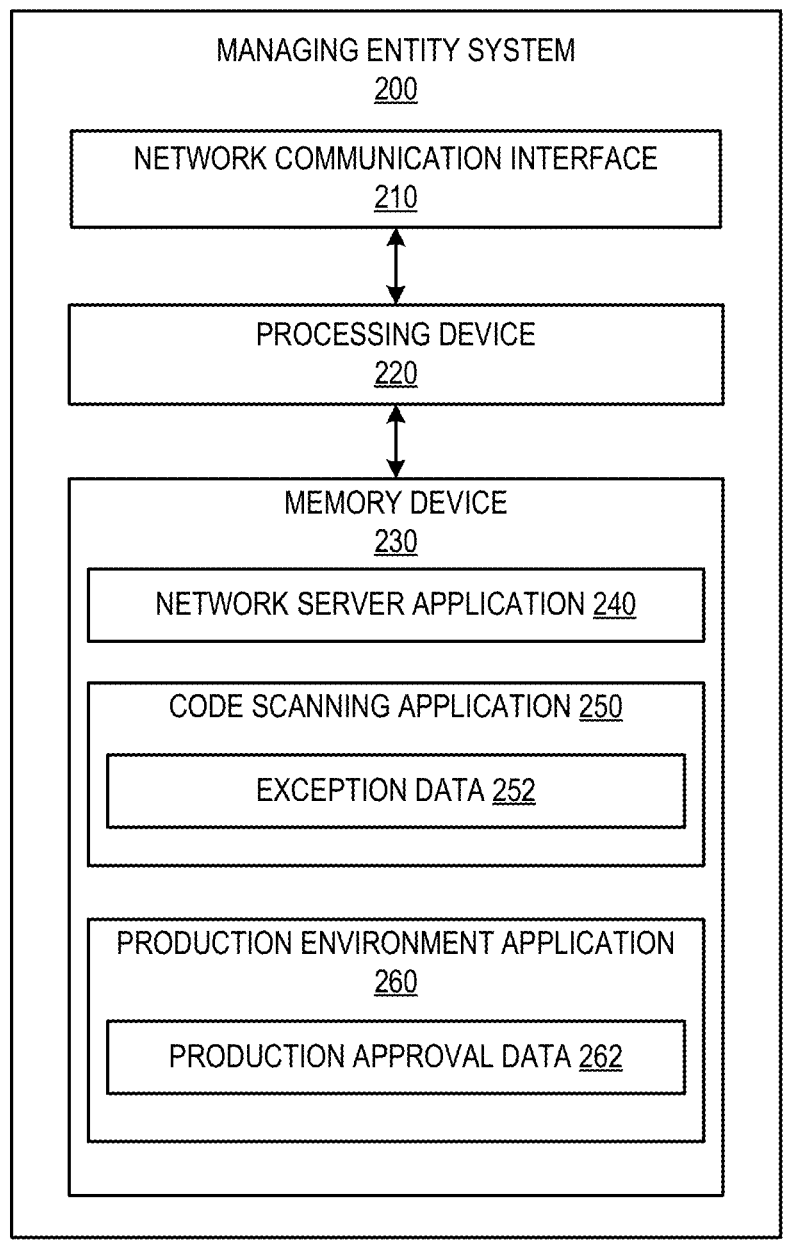
Figure 3:
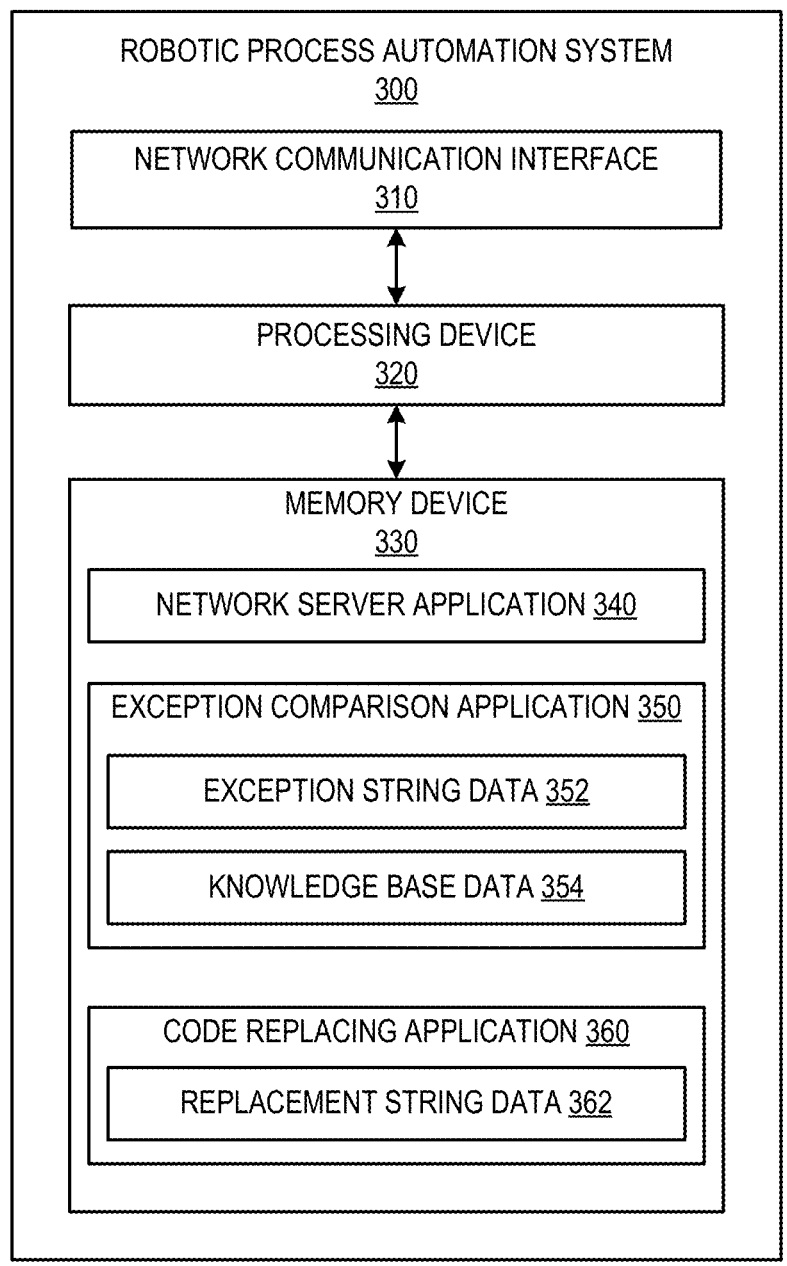
Figure 4:
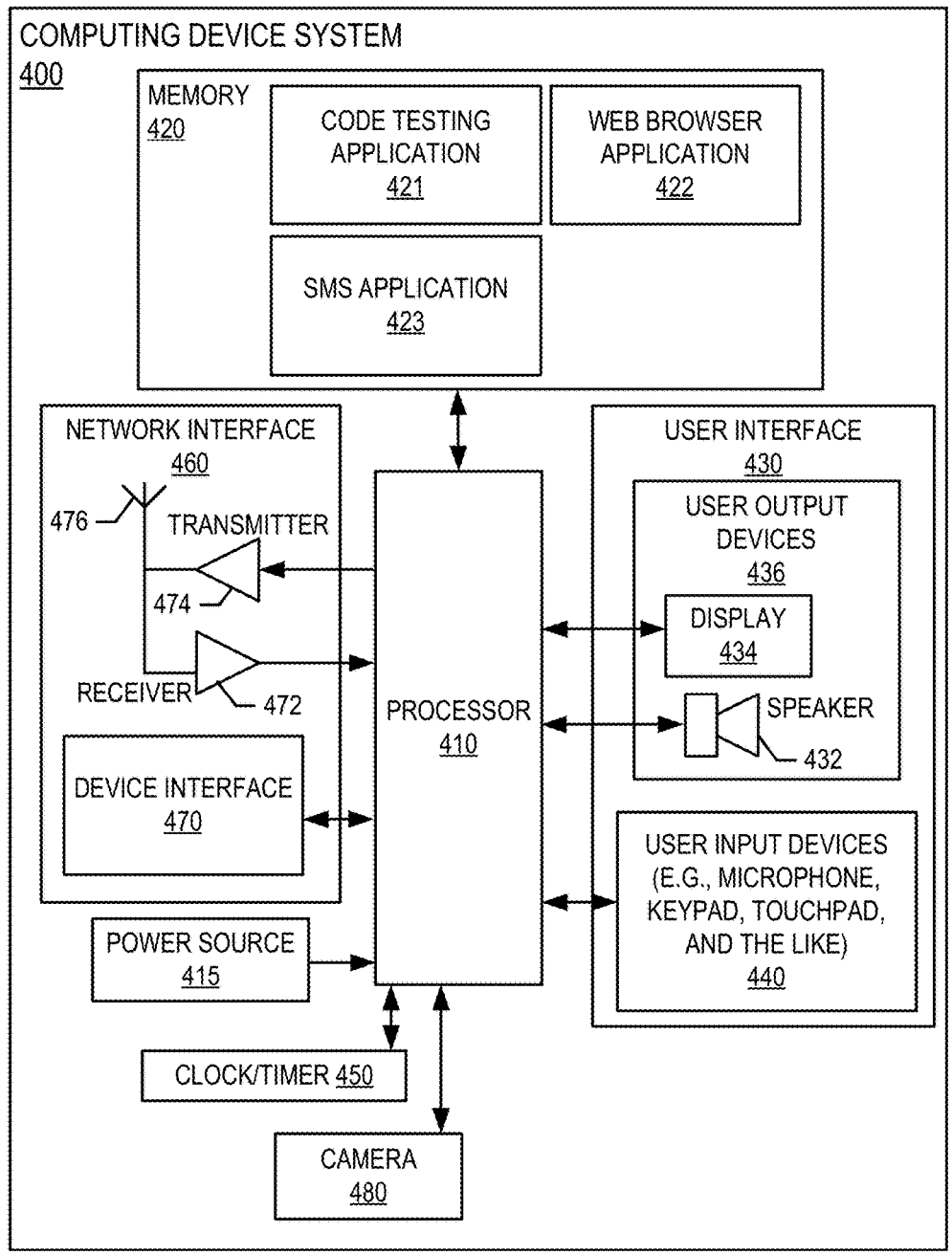
Figure 5:
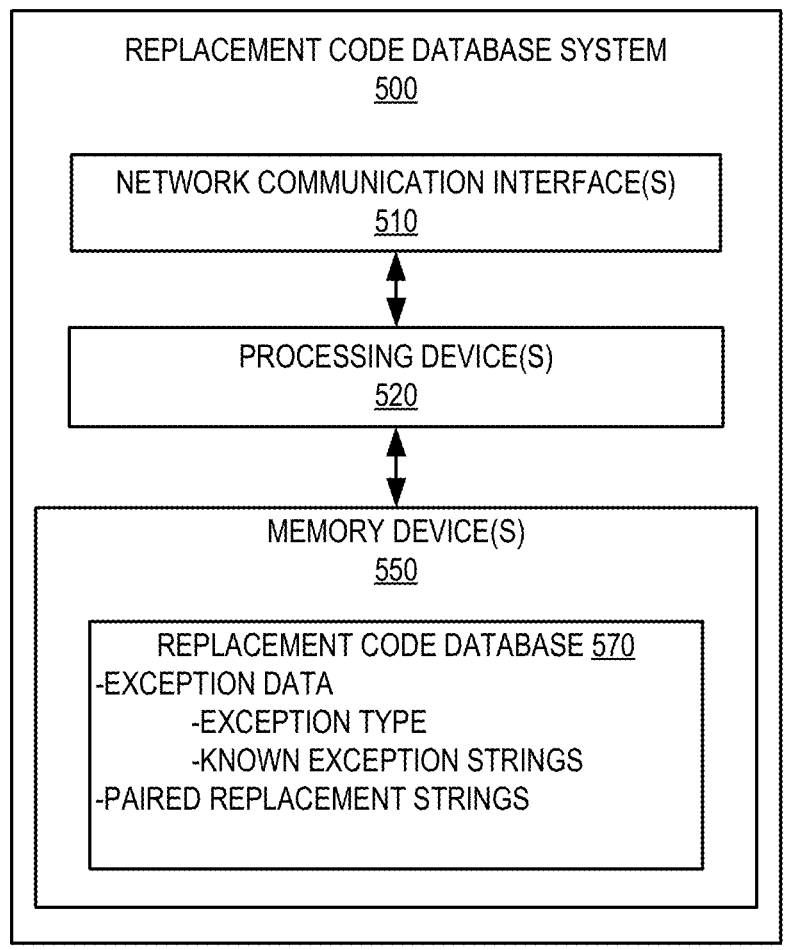
Figure 6:
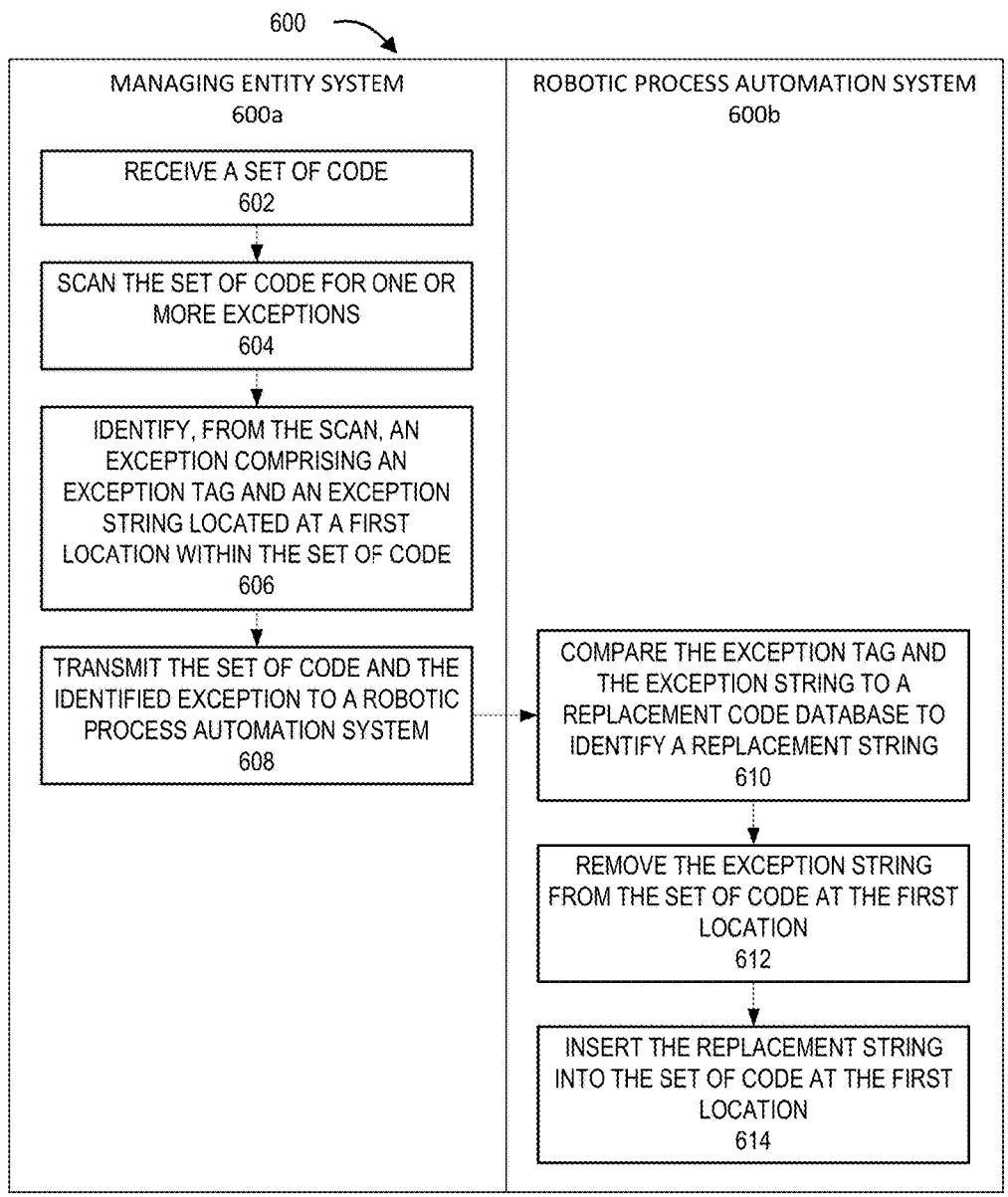
Figure 7:
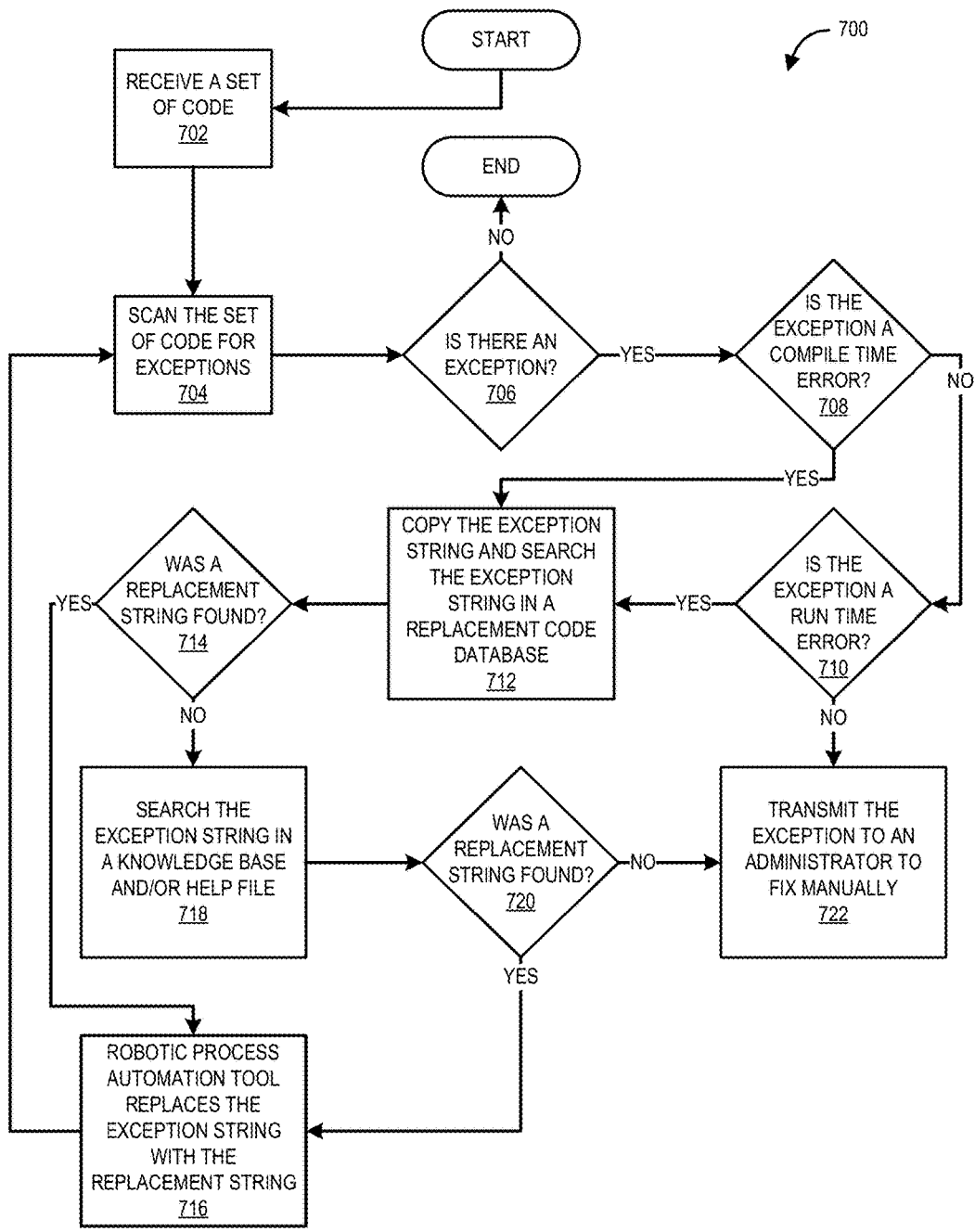

Having thus described embodiments of the invention in general terms, reference will now be made the accompanying drawings, wherein:

FIG. 1 provides a block diagram illustrating a system environment for the utilization of a robotic process automation system for functional evaluation and improvement of back end instructional constructs, in accordance with an embodiment of the invention;

FIG. 2 provides a block diagram illustrating the managing entity system 200 of FIG. 1, in accordance with an embodiment of the invention;

FIG. 3 provides a block diagram illustrating the robotic process automation system of FIG. 1, in accordance with an embodiment of the invention;

FIG. 4 provides a block diagram illustrating the computing device system of FIG. 1, in accordance with an embodiment of the invention;

FIG. 5 provides a block diagram illustrating the replacement code database system of FIG. 1, in accordance with an embodiment of the invention;

FIG. 6 provides a flowchart illustrating a process for the utilization of a robotic process automation system for functional evaluation and improvement of back end instructional constructs, in accordance with embodiments of the invention; and FIG. 7 provides a flowchart illustrating a process for analyzing a set of code for exceptions in a set of code and determining solutions to the exceptions, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "code" or "string" may refer to any computing programming language, back end instructional constructs, source code, software, and the like for causing a computing device to perform one or more functions.

Embodiments of the present invention provide a system for the utilization of a robotic process automation system for functional evaluation and improvement of back end instructional constructs. The system may scan a set of code to identify an exception comprising an exception tag and an exception string located at a first location within the set of code. The system may then transmit the set of code and the identified exception to a robotic process automation system, along with instructions for the robotic process automation system to compare the exception tag and exception string to a replacement code database to identify an exception string. The robotic process automation system can then replace the exception string in the set of code with the identified replacement string.

FIG. 1 provides a block diagram illustrating a system environment 100 for utilizing a robotic process automation system for functional evaluation and improvement of back end instructional constructs, in accordance with an embodiment of the invention. As illustrated in FIG. 1, the environment 100 includes a managing entity system 200, a robotic process automation system 300, a computing device system 400, a replacement code database system 500, a knowledge base system 120, and one or more third party systems 130. One or more users 110 may be included in the system environment 100. In some embodiments, the user(s) 110 of the system environment 100 may be administrators, software engineers, programmers, computer science engineers, managers, and the like. In some embodiments, a user 110 is a specialist that is skilled in replacing exceptions in a string of code with a replacement code and/or identifying the replacement code in response to receiving an indication of the exception in the string of code. A user 110 may be an employee of a managing entity associated with the managing entity system 200.

The managing entity system 200, the robotic process automation system 300, the computing device system 400, the replacement code database system 500, the knowledge base system 120, and/or the third party system 130 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The managing entity system 200 may be a system owned or otherwise controlled by a managing entity (e.g., a financial institution, a software development or implementation organization, and the like) to perform one or more process steps described herein. In some embodiments, the managing entity is a financial institution. In general, the managing entity system 200 is configured to communicate information or instructions with the robotic process automation system 300, the computing device system 400, the replacement code database system 500, the knowledge base system 120, and/or the third party system 130 across the network 150.

For example, the managing entity system 200 may be configured to receive a set of code (e.g., from the computing device system 400, from a third party system 130, from an internal database, and the like), scan the set of code for one or more exceptions, identify an exception comprising an exception tag and an exception string located at a first location within the set of code, transmit the set of code and the identified exception to the robotic process automation system 300, and the like. Of course, the managing entity system 200 may be configured to perform (or instruct other systems to perform) one or more other process steps described herein. The managing entity system 200 is described in more detail with respect to FIG. 2.

The robotic process automation system 300 may by a system owned or controlled by the managing entity and/or a third party that specializes in providing robotic process automation devices and tools for searching databases and other resources to identify replacement code for exceptions in a set of code, and then replacing the exceptions in the set of code with the identified replacement code. In general, the robotic process automation system 300 is configured to communicate information or instructions with the managing entity system 200, the computing device system 400, the replacement code database system 500, the knowledge base system 120, and/or the third party system 130 across the network 150.

For example, the robotic process automation system 300 may receive a set of code and an identified exception from the managing entity system 200, compare the exception tag and the exception string to the replacement code database system 500 and/or the knowledge base system 120, replace the exception string with the replacement string, and transmit the resulting set of code with the replacement string included back to the managing entity system 200 and/or the computing device system 400. Of course, the robotic process automation system 300 may be configured to perform (or instruct other systems to perform) one or more other process steps described herein. The robotic process automation system 300 is described in more detail with respect to FIG. 3.

The computing device system 400 may by a system owned or controlled by the managing entity and/or a third party that specializes in scanning a set of code for exceptions, identifying exceptions in the code, receiving user input to replace exception strings with replacement strings, and the like. While a single computing device is illustrated in FIG. 1 as representing the computing device system 400, it should be known that any number of computing devices may be utilized by the computing device system 400 within the system environment 100. In general, the computing device system 400 is configured to communicate information or instructions with the managing entity system 200, the robotic process automation system 300, the replacement code database system 500, the knowledge base system 120, and/or the third party system 130 across the network 150.

For example, the computing device system 400 may be configured to receive a set of code from the managing entity system 200, the robotic process automation system 300, or the third party system 130; receive instructions, prompts, or other requests from the managing entity system 200 or the robotic process automation system 300 and present these instructions, prompts, or requests on a display of the computing device system 400; receive user input (e.g., a replacement code, a confirmation that a replacement code is appropriate, and the like) from the user 110 via a user interface of the computing device system 400, and transmit the user input to the managing entity system 200, the robotic process automation system 300, the replacement code database system 500, the knowledge base system 120, and/or the third party system 130. Of course, the computing device system 400 may be configured to perform (or instruct other systems to perform) one or more other process steps described herein. The computing device system 400 is described in more detail with respect to FIG. 4.

The replacement code database system 500 may by a system owned or controlled by the managing entity and/or a third party that specializes in data storage, particularly concerning data that links or otherwise associates known exception errors (e.g., exception tags, exception strings, and the like) with known replacement strings (e.g., replacement code). In general, the replacement code database system 500 is configured to communicate information or instructions with the managing entity system 200, the robotic process automation system 300, the computing device system 400, the knowledge base system 120, and/or the third party system 130 across the network 150.

For example, the replacement code database system 500 may receive instructions or prompts from the managing entity system 200 or the robotic process automation system 300 to present, transmit, or otherwise display information associated with replacement code (or replacement code options). In some embodiments, the replacement code database system 500 continuously or periodically accesses the knowledge base system 120 to identify new pairings of exceptions and replacement code, including improvements in certain replacement code for a single exception. Of course, the replacement code database system 500 may be configured to perform (or instruct other systems to perform) one or more other process steps described herein. The replacement code database system 500 is described in more detail with respect to FIG. 5.

The knowledge base system 120 may be a system owned or controlled by the managing entity and/or one or more third parties that specializes in providing a widely-sourced (or expertly sourced) set of knowledge concerning exceptions (exception tags and/or exception strings) and the replacement strings that can or should be used to correct, mitigate, or otherwise resolve each exception. The knowledge base system 120 may be different from the replacement code database system 500 (or any other conventional database) because the knowledge base system 120 may utilize logical assertions and conditions about the programming world (e.g., in the form of "if-then" rules). In this way, the knowledge base system 120 is configured to make sense of unstructured data or data from multiple sources through the use of the logical assertions and conditions. In some embodiments, the knowledge base system 120 incorporates, comprises, or accesses at least a portion of the replacement code database system 500.

The third party system 130 may be any system that provides valuable information, checks and balances, and the like to the system environment 100. The third party system 130 may be a forum or other social media platform that includes posts and other information about exceptions, replacement code strings, links or rules for pairing the exceptions and their respective replacement code strings, and the like. In some embodiments, the third party system 130 comprises a data feed of paired exceptions and associated replacement strings. For example, the third party system 130 may continuously or periodically update the replacement code database system 500 with paired exceptions and replacement strings, such that the system environment 100 is continuously updated with the most up-to-date information to allow the robotic process automation system 300 to make the best decisions possible in identifying correct replacement strings.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a code scanning application 250 which includes exception data 252, a production environment application 260 which includes production approval data 262, and other computer-executable instructions or other data. The computer-executable program code of the network server application 240, the code scanning application 250, and/or the production environment application 260 may instruct the processing device 220 to perform certain logic, data-processing, and data-storing functions of the managing entity system 200 described herein, as well as communication functions of the managing entity system 200.

In one embodiment, the code scanning application 250 includes exception data that may include information about known and potential exceptions (e.g., errors, issues, warnings, and the like) in a written code, the types of these exceptions, line and character information for the exceptions, information about how an overall set of code would operate if the exception is not resolved, and the like. In this way, the system may be configured to scan sets of code to identify these exceptions including, but not limited to, exception types and locations in the set of code where the exception string is present.

In one embodiment, the production environment application 260 includes production approval data 262. This production approval data 262 may include information for determining whether a set of code is in condition to enter the production environment. For example, the production approval data may include information on whether a set of code has any exceptions (or any material exceptions) and to transmit notifications with indications of approval for the set of code to enter the production environment in the event no exceptions (or no material exceptions) are present. The production approval data 262 may also include information about the materiality of an identified exception. In this way, the production environment application 260 can make a determination as to whether any identified exception is material or not, with respect to the set of code entering the production environment.

The network server application 240, the code scanning application 250, and the production environment application 260 are configured to invoke or use the exception data 252, the production approval data 262, and the like when communicating through the network communication interface 210 with the robotic process automation system 300, the computing device system 400, the replacement code database system 500, the knowledge base system 120, and/or the third party system 130.

As used herein, a "communication interface" generally includes a modem, server, transceiver, and/or other device for communicating with other devices on a network, and/or a user interface for communicating with one or more customers. Referring again to FIG. 2, the network communication interface 210 is a communication interface having one or more communication devices configured to communicate with one or more other devices on the network 150, such as the robotic process automation system 300, the computing device system 400, the replacement code database system 500, the knowledge base system 120, the third party system 130, and the like. The processing device 220 is configured to use the network communication interface 210 to transmit and/or receive data and/or commands to and/or from the other devices connected to the network 150.

FIG. 3 provides a block diagram illustrating the robotic process automation system 300, in greater detail, in accordance with embodiments of the invention. As illustrated in FIG. 3, in one embodiment of the invention, the robotic process automation system 300 includes one or more processing devices 320 operatively coupled to a network communication interface 310 and a memory device 330. In certain embodiments, the robotic process automation system 300 is operated by a first entity, such as a financial institution, while in other embodiments, the robotic process automation system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the robotic process automation system 300 described herein. For example, in one embodiment of the robotic process automation system 300, the memory device 330 includes, but is not limited to, a network server application 340, an exception comparison application 350 which includes exception string data 352 and knowledge base data 354, a code replacing application 360 which includes replacement tag and string data 362, and other computer-executable instructions or other data. The computer-executable program code of the network server application 340, the exception comparison application 350, and/or the code replacing application 360 may instruct the processing device 320 to perform certain logic, data-processing, and data-storing functions of the robotic process automation system 300 described herein, as well as communication functions of the robotic process automation system 300.

In one embodiment, the exception comparison application 350 includes exception tag and string data 352 and knowledge base data 354. The exception tag and string data 352 may comprise information about an identified exception, including the type of exception (e.g., the exception tag), the actual exception string from an identified exception, the components of the exception string, a location of the exception string in the set of code associated with the exception, and the like. As such, the exception comparison application 350 may be configured to compare the exception tag and string data 352 to data or information in a replacement code database, in a knowledge database, and the like, to identify a replacement string that can be used in the place of an exception string of an identified exception.

The knowledge base data 354 may include particular rules, settings, conditions, priorities, and the like for using a knowledge base to identify a replacement string that can be used in place of an exception string of an identified exception. For example, the knowledge base data 354 may include information about the programming language(s) in use, the types of forums or platforms that are trusted or likely to include helpful information to identify the replacement string, particular forums or platforms that should be used first or given a higher priority in the comparison steps, and the like. As such, the exception comparison application can access or otherwise utilize a specialized and particular knowledge base system with rules and conditions that are specifically designed with the programming language and/or identified exception in mind.

In one embodiment, the code replacing application 360 includes replacement string data 362. This replacement string data 362 may be identified and/or generated by the exception comparison application 350 and stored in the memory to be associated with the replacement string data 362. In this way, the robotic process automation system 300 can utilize the code replacing application 360 to insert the identified replacement string data 362 at a location in the set of code where the exception string was previously identified.

The network server application 340, the exception comparison application 350, and the code replacing application 360 are configured to invoke or use the exception tag and string data 352, the knowledge base data 354, the replacement string data 362, and the like when communicating through the network communication interface 310 with the managing entity system 200, the computing device system 400, the replacement code database system 500, the knowledge base system 120, and/or the third party system 130.

The robotic process automation system 300 may also be configured to store information about its actions over time in a log or other data repository. In this way, the actions of the robotic process automation system 300, including its decision making process, the data it analyzes, its time to complete a task, and the like, can be recorded for auditing, performance analysis, and efficiency monitoring purposes. In this way, a user (e.g., the user 110) may be able to review the data log of the robotic process automation system 300 to determine whether the robotic process automation system 300 has made efficient and correct decisions over a certain period of time.

The robotic process automation system 300 may comprise a single robotic process automation device or tool comprising the components described herein that is configured to perform some or all actions of the robotic process automation system 300 as described herein (e.g., the processes 600 and 700 of FIG. 6 and FIG. 7, respectively).

In other embodiments, multiple robotic process automation devices or tools may make up the robotic process automation system 300, where the multiple robotic process automation devices or tools may be configured to execute certain process steps described herein in parallel. For example, the resource intensive steps like comparing an identified exception tag and exception string to known exception tags and strings in a replacement code database (or knowledge base) may be executed using several robotic process automation tools at once, where each robotic process automation tool performs a portion of the overall comparison, performs comparisons of different databases or portions of databases, utilizes a unique comparison scheme or technique, and the like. In this way, the robotic process automation system can perform robust and resource-intensive comparisons in a shorter amount of time (compared to a single comparison by a single comparison tool), with a more specialized approach that is beneficial to the successful identification of a replacement string for an identified exception string.

FIG. 4 provides a block diagram illustrating a computing device system 400 of FIG. 1 in more detail, in accordance with embodiments of the invention. In one embodiment of the invention, the computing device system 400 is a desktop personal computer, workstation, laptop computer, or the like. In other embodiments, the computing device system 400 is a mobile device like a mobile telephone, a smart phone, a tablet computer, and the like. However, these example devices are merely illustrative of one type of computing device that the computing device system 400 may benefit from, employ, or otherwise be involved with and, therefore, should not be taken to limit the scope of embodiments of the present invention. Other types of computing devices may include portable digital assistants (PDAs), pagers, mobile televisions, gaming devices, laptop computers, cameras, video recorders, audio/video player, radio, global positioning system (GPS) devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless telephone network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface 430 that is, like other user interfaces described herein, made up of user output devices 436 and/or user input devices 440. The user output devices 436 include a display 434 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface 430 may also include a camera 480, such as a digital camera.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422 and/or a code testing application 421 (or any other application provided by the managing entity system 400). These applications also typically instructions to a graphical user interface (GUI) on the display 434 that allows the user 110 to interact with the computing device system 400, the managing entity system 400, and/or other devices or systems. In one embodiment of the invention, when the user 110 downloads, is assigned, or otherwise obtains the code testing application 421 from the managing entity system 200, or from a distinct application server (e.g., from the third party system 130). In other embodiments of the invention, the user 110 interacts with the managing entity system 200, the robotic process automation system 300, the replacement code database system 500, the knowledge base system 120, and/or the third party system 130 via the web browser application 422 in addition to, or instead of, the code testing application 421.

The code testing application 421 may be configured to utilize the processor 410 to cause the computing device system 400 to perform one or more actions in direct response to receiving instructions from the managing entity system 200 and/or the robotic process automation system 300. For example, the managing entity system 200 may transmit a set of code to the computing device system 400 to activate the code testing application 421 to cause the processor 410 to scan, examine, test, or otherwise analyze strings in the set of code for exceptions (e.g., errors, warnings, potential errors, inconsistencies, and the like).

The memory 420 of the computing device system 400 may comprise a Short Message Service (SMS) application 423 configured to send, receive, and store data, information, communications, alerts, and the like via the wireless telephone network 152.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein. For example, the memory 420 may include such data as exception data, replacement data, contact information, and the like.

FIG. 5 provides a block diagram illustrating a replacement code database system 500, in accordance with embodiments of the invention. As illustrated in FIG. 5, the replacement code database system 500 generally includes, but is not limited to, a network communication interface 510, one or more processing devices 520, and one or more memory devices 530. The processing device 520 is operatively coupled to the network communication interface 510 and the memory device 530.

In some embodiments, the replacement code database 540 stores data including, but not limited to, exception data (including, but not limited to, exception types, known exception strings, information about an exception string's location within a set of code, information about other strings of code around or otherwise within a set of code with an exception, and the like) and replacement strings that are paired to particular exception types and/or exception strings. The replacement code database 540 may comprise exception data and paired replacement strings for more than one programming language, and therefore can be a single resource for identifying replacement code strings to be used in the place of identified exception code strings.

The network communication interface 510 is a communication interface having one or more communication devices configured to communicate with one or more other devices on the network 150. The processing device 520 is configured to use the network communication interface 510 to receive information from and/or provide information and commands to the managing entity system 200, the robotic process automation system 300, the computing device system 400, the knowledge base system 120, and/or the third party system 130 via the network 150.

The processing device 520 is configured to use the network communication interface 510 to gather data, such as data from a third party system 130 or social medial (e.g., exception information forum) platform in real time or periodically, and storing this data in the replacement code database 540. The processing device 520 stores the data that it receives in the replacement code database 540 within the memory device 530. In some embodiments, the system network communication interface 510 may be configured to be continuously accessible by the managing entity system such that data from the replacement code database 540 may be continuously accessed, extracted, and/or analyzed.

Referring now to FIG. 6, a flowchart is provided to illustrate one embodiment of a process 600 for utilization of a robotic process automation system for functional evaluation and improvement of back end instructional constructs, in accordance with embodiments of the invention. As shown in FIG. 6, some components of the process 600a may be undertaken by (or otherwise overseen by or instructed from) a managing entity system. Likewise, some components of the process 600b may be undertaken by (or otherwise overseen by or instructed from) a robotic process automation system In some embodiments, the process 600 may include block 602, where the system receives a set of code. In some embodiments, this process 600 begins as a programmer enters their set of code for a particular feature or function of an overall software structure that is to be used in a production environment. Therefore, this set of code may be a pre-production set of code. In other embodiments, the system receives a set of code that is to be inspected for exceptions in preparation for general use, backend use, non-production use, or any other use where the set of code should still be free of material exceptions in order to operate as intended. In some embodiments, receiving the set of code comprises actively accessing a set of code from a database of stored sets of code.

In some embodiments, the process 600 includes block 604, where the system scans the set of code for one or more exceptions. Again, exceptions may be any errors, warnings, redundancies, or the like in a set of code. The exceptions may be identified as incorrect spellings for a string of code within the set of code, as an improper formatting of the code, as an inconsistent or otherwise incompatible string within the set of code, and the like. As such, the exception may be identified as an error in the language of the code itself. In other embodiments, the exception may be identified as an incompatibility or inconsistency in how the set of code operates or functions when tested in a production-like environment. For example, the exception may be identified by determining that the set of code is not compatible with other sets of code, on certain types of computing devices, in real-world conditions, when an overall production-like environment is under certain stress limits, and the like.

As such, the process 600 may include block 606, where the system identifies, from the scan in block 604, an exception of the one or more exceptions, wherein the exception comprises an exception tag and an exception string located at a first location within the set of code. The exception tag may be information about the exception including, but not limited to, a type of exception, a length of the exception, a position of the exception (i.e., at the first location), a number of characters associated with the exception, a resulting internal consequence in processing of the set of code, a resulting external consequence resulting from the exception (e.g., an incompatibility outside of the set of code itself that is due to an exception in the set of code), and the like.

The exception string may be the set of characters associated with the exception, their location within the set of code, one or more sets of code that surround or are otherwise associated with the exception string (e.g., sets of code that are called or otherwise referenced by the code in the exception string), and the like. In some embodiments, the exception string comprises one or more punctuation marks, one or more letters or numbers, one or more words or phrases, one or more code words or phrases, one or more functions, one or more characters within a function set, and the like.

The first location is one or more points within the set of code at which the exception string is located. For example, the first location may comprise a line number of the set of written code where the exception string is located. If the exception string covers more than one line, then each of those lines of written code can be identified as the first location. Furthermore, in some embodiments, the first location includes a reference to a numbering or other position of the one or more characters that make up the exception string. For example, the exception string may be a function called on a particular line of the written set of code. The system can identify which characters within that particular line are associated with the function that is the exception string (e.g., characters X through Y of line Z).

In some embodiments, the system may save the exception to an exception database (e.g., within the managing entity system 200 of FIG. 1, within a computing device system like the computing device system 400 of FIG. 1, and the like. This saved exception may then, in some embodiments, be referenced by the robotic process automation system 300 of FIG. 1, if necessary, as part of a process to identify a replacement string of code for that exception.

The process 600 may also include block 608, where, in response to identifying the exception in the code, the system transmits the set of code and the identified exception to a robotic process automation system. In some embodiments, the robotic process automation system is a component of the managing entity system and therefore no transmittal of the data is necessary. For example, the robotic process automation system may comprise a robotic process automation tool that is a component of the managing entity system. Instead, the system can transmit a request for the robotic process automation system to access a database of the set of code and the identified exception to perform the other steps of the process 600*b* associated with the robotic process automation system.

In some embodiments, the system may first check to determine whether the exception is of an exception type that warrants the use of the robotic process automation system. For example, the system may determine that the exception type is a compile time error and/or a run time error before transmitting the set of code and the identified exception to the robotic process automation system. If, instead, the system determines that the exception is neither a compile time error nor a run time error, the system may instead transmit the set of code and the identified exception to a computing device of an administrator, programmer, or other specialized user that is trained to manually address the other types of exceptions.

To transmit the set of code and the exception to the robotic process automation system, the managing entity system (or whichever system has identified the exception in the set of code) may establish a secure, dedicated communication channel between itself and the robotic process automation system and transmit the information and data securely once the connection is successfully established.

In some embodiments, the process 600 includes block 610, where the robotic process automation system compares the exception tag and the exception string to a replacement code database to identify a replacement string. In some embodiments, comparing the exception tag and the exception string to the replacement code database comprises querying a relational database of known exception tags or known exception strings and paired known replacement code for each of the known exception tags or known exception strings. The matching of the exception tag and/or the exception string to known exceptions tags and strings may be determined based on a complete (i.e., 100%) match of the identified and known exception information or, in some embodiments, the robotic process automation system may utilize a confidence score methodology to determine which known exception tag and/or exception string are the most closely related to the identified exception tag and/or exception string.

Additionally or alternatively, comparing the exception tag and the exception string to the replacement code database may comprise processing the exception tag as an input to identify the replacement string through a search of a knowledge base associated with a programming language associated with the set of code. The knowledge base may be a computer program that utilizes a knowledge base, a user interface, and an inference engine to solve or identify complex problems. As such, in some embodiments, the robotic process automation system may include or be a portion of the knowledge base system (e.g., the inference engine).

The knowledge base itself may be a database (e.g., relational database, non-relational database, structured database, non-structured database, a plurality of varied databases, information from third party or online platforms like forums, and the like) with information about particular exception tags and exceptions strings, and replacement strings associated with those exception tags and exception strings. In some embodiments, the knowledge base is continuously updated as information is added to databases associated with the knowledge base, as information on forums or other sites are provided and/or verified by experts, and the like. In this way, the knowledge base can grow to represent the cumulative knowledge of a group of experts as the knowledge of the experts is recorded. In some embodiments, data is stored within the knowledge base in the form of subsumption ontology, where pieces of information are associated with definitions about how they relate to other pieces of information in the database or a set of information in the database.

The inference engine may be a processor configured to analyze the information stored in the knowledge base using logical assertions and conditions for determining replacement strings for exceptions in a set of code. As such, the inference engine may utilize the subsumption ontology and other relational features of the knowledge base to make comparisons between the identified exception tag and exception string and certain known exception tags and exceptions strings that are within the knowledge base.

As with the comparison to a regular database, the robotic process automation system may cause inference engine to determine a set of an exception tag and exception string that is the best match for the identified exception tag and exception string. Again, the match may be a perfect match or a best match. Once the robotic process automation system has identified the best match, the robotic process automation system can identify the paired replacement string of code that is associated with the best matched known exception tag and known exception string. This paired replacement string is the identified replacement string that can be used to replace the exception string in the set of code.

Furthermore, in some embodiments, comparing the exception tag and the exception string to the replacement code database comprises trawling online forums associated with a programming language associated with the set of code over an Internet system to identify the replacement string associated with the exception tag and the exception string. In some embodiments, when the system finds a matching known exception tag or string in the online forum, the system may transmit a confirmation request to a computing device of a specialist trained to understand whether a set of code will operate as intended. Upon receiving a confirmation that the identified replacement string is correct, the robotic process automation system may continue with the steps of its process 600b utilizing the identified replacement string from the online forum.

Additionally, in some embodiments, the process 600 includes block 612, where the robotic process automation system removes the exception string from the set of code at the first location. Depending on the type of exception, the length or format of the exception string, and the like, the system may delete, remove, hide, or otherwise inhibit the exception string within the set of code. For example, the system may simply delete the exception code from the first location in the set of code, possibly leaving an indicator of the position of the first location within the set of code. In other embodiments, the system may keep the text of the written exception code within the set of code, but add a feature to the code that instructs a processor reading the code to ignore the text of the exception string. In this case, the actual wording and general format of the exception code will remain in the document, but this code will not be readable or actionable in the document comprising the set of code itself. This will help the system to record the changes that are made to the code, prior iterations of the code, and other helpful information for any future review of how and why the code has changed over time.

In some embodiments, the system generates a new set of code identical to the original set of code, then extracts the exception string and saves the new set of code as a separate document from the original set of code. In this way, the original set of code may be preserved for future review, analysis, or documentation purposes. In other embodiments, the system may simply extract the exception from the original document comprising the set of code, without creating a new document.

Finally, the process 600 may continue to block 614, where the system inserts the replacement string into the set of code at the first location. Once the exception has been removed, the replacement code can be added or otherwise inserted to the set of code at the same position. In some embodiments, the replacement code may be too large, or require the use of new or undefined functions that may not be appropriate to add at the first location. In such embodiments, the system may generate a new document or add on to the original document to accommodate the large new code or the new or undefined functions while calling the additional language from the first location of the set of code.

In some embodiments, the system may additionally receive, from the robotic process automation system, the set of code with the inserted replacement string. In response to receiving the set of code with the inserted replacement string, scan the set of code with the inserted replacement string for new exceptions.

In some such embodiments, when the system determines that no new exceptions are present in the set of code with the inserted replacement string, the system may store the set of code with the inserted replacement string in a production database. The system may then transmit, to a computing device of a user, an indication that the set of code with the inserted replacement string is in condition to enter production.

In other such embodiments, when the system determines that a new exception is present in the set of code with the inserted replacement string, the system may transmit, to a computing device of a user, an indication that the set of code with the inserted replacement string is not in condition to enter production.

Turning now to FIG. 7, a flowchart is provided to illustrate one embodiment of a process 700 for utilization of a robotic process automation system for functional evaluation and improvement of back end instructional constructs, in accordance with embodiments of the invention. In some embodiments, a robotic process automation system performs the steps illustrated in blocks 712 through 720.

The process 700 begins be receiving the set of code at block 702. Once the set of code has been received, the system will scan the set of code for exceptions, as indicated at block 704. As shown at block 706, a determination is made, based on the scan from block 704, as to whether there is an exception in the set of code. If there is no exception, the process 700 ends and the set of code is ready to enter production. However, if an exception is discovered, the process 700 moves to block 708 where a determination is made as to whether the exception is a compile time error. If the exception is determined to be a compile time error, then the process 700 will move to block 712, discussed below. If, however, the exception is determined to not be a compile time error, the process proceeds to block 710, where the system determines if the exception is a run time error. If the exception is determined to not be a run time error, then the exception is transmitted to a computing device of an administrator or other specialist that will be tasked with fixing the exception manually, as shown in block 722.

In some embodiments, once the administrator or specialist has identified the replacement string, the administrator or specialist may transmit manually determined exception string to the system (e.g., from the computing device of the administrator or specialist). The system can then pair the identified exception with the manually determined replacement string in the replacement string database. In this way, the replacement string database and the system overall is prepared to match the same exception or exception type the next time that exception is identified.

When the exception is determined to be a run time error or, as mentioned above, the exception is determined to be a compile time error, the system may proceed to block 712 where the exception string is copied and a replacement code database is searched to find the same or a similar exception string within the database. Of course, as mentioned with respect to the process 600 of FIG. 6, the exception tag may additionally or alternatively be copied and searched for in the replacement code database. Furthermore, the replacement code database may comprise a knowledge base and/or a set of online forums that can be trawled by the system to search for the replacement string. This process 700 is merely illustrative of one technique for utilizing a robotic process automation system to identify and replace an exception string with a replacement string.

Next, the system determines whether a replacement string was found in the replacement code database, as indicated in block 714. If the replacement string was found, the system proceeds to block 716, discussed below. If, however, the replacement string was not found, the system may proceed to block 718, where a knowledge base and/or help file is searched based on the exception string (and/or the exception tag or other exception information). The system can then make the determination at block 720 as to whether the replacement string was found from the search of the knowledge base and/or help file. If no replacement string was found, the system proceeds to block 722 where the exception is transmitted to the computing device of the administrator, programmer, or other specialist tasked with fixing the exception in the set of code manually.

Otherwise, if the replacement string is found by the search, the system proceeds to block 716, where the robotic process automation tool replaces the exception string in the set of code with the replacement string. This replacement should fix the exception for the set of code, but the system can still re-check the set of code, this time with the replacement code inserted or otherwise added to the set of code to determine if the updated code is ready for the production environment.

As such, the process may continue back to block 704, where the system will scan the set of code (this time including the replacement string in the place of the exception string) for any exceptions. Once no exception is found in the set of code, as determined at block 706, the process 700 ends and the set of code is ready to be implemented.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for utilization of a robotic process automation system for functional evaluation and improvement of back end instructional constructs, the system comprising:
  a memory device; and
  a processing device operatively coupled to the memory device, wherein the processing device is configured to execute computer-readable program code to:
    receive a set of code;
    scan the set of code for one or more exceptions;
    identify, from the scan, an exception of the one or more exceptions, wherein the exception comprises an exception tag and an exception string located at a first location within the set of code, wherein the exception tag includes a type of the exception and a location of the exception;
    determine whether the type of the exception is a compile time error or a run time error; and
    in response to identifying the exception and determining whether the type of the exception is a compile time error or a run time error, transmit the set of code and the identified exception to a robotic process automation system configured to:
      compare the exception tag and the exception string to a replacement code database to identify a replacement string;
      remove the exception string from the set of code at the first location; and
      insert the replacement string into the set of code at the first location.

2. The system of claim 1, wherein comparing the exception tag and the exception string to the replacement code database comprises querying a relational database of known exception tags or known exception strings and paired known replacement code for each of the known exception tags or known exception strings.

3. The system of claim 1, wherein comparing the exception tag and the exception string to the replacement code database comprises processing the exception tag as an input to identify the replacement string through a search of a knowledge base associated with a programming language associated with the set of code.

4. The system of claim 1, wherein comparing the exception tag and the exception string to the replacement code database comprises trawling online forums associated with a programming language associated with the set of code over an Internet system to identify the replacement string associated with the exception tag and the exception string.

5. The system of claim 1, wherein the processing device is further configured to execute the computer-readable program code to:
  receive, from the robotic process automation system, the set of code with the inserted replacement string; and
  in response to receiving the set of code with the inserted replacement string, scan the set of code with the inserted replacement string for new exceptions.

6. The system of claim 5, wherein the processing device is further configured to execute the computer-readable program code to:
  determine that no new exceptions are present in the set of code with the inserted replacement string;
  store the set of code with the inserted replacement string in a production database; and transmit, to a computing device of a user, an indication that the set of code with the inserted replacement string is in condition to enter production.

7. The system of claim 5, wherein the processing device is further configured to execute the computer-readable program code to:
  determine that a new exception is present in the set of code with the inserted replacement string; and
  in response to determining that a new exception is present in the set of code with the inserted replacement string, transmit, to a computing device of a user, an indication that the set of code with the inserted replacement string is not in condition to enter production.

8. A computer program product for utilization of a robotic process automation system for functional evaluation and improvement of back end instructional constructs, the computer program product comprising at least one non-transitory computer readable medium comprising computer readable instructions, the instructions comprising instructions for:
  receiving a set of code;
  scanning the set of code for one or more exceptions;

identifying, from the scan, an exception of the one or more exceptions, wherein the exception comprises an exception tag and an exception string located at a first location within the set of code, wherein the exception tag includes a type of the exception and a location of the exception;

determining whether the type of the exception is a compile time error or a run time error; and in response to identifying the exception and determining whether the type of the exception is a compile time error or a run time error, transmitting the set of code and the identified exception to a robotic process automation system configured to:

compare the exception tag and the exception string to a replacement code database to identify a replacement string;

remove the exception string from the set of code at the first location; and insert the replacement string into the set of code at the first location.

9. The computer program product of claim 8, wherein comparing the exception tag and the exception string to the replacement code database comprises querying a relational database of known exception tags or known exception strings and paired known replacement code for each of the known exception tags or known exception strings.

10. The computer program product of claim 8, wherein comparing the exception tag and the exception string to the replacement code database comprises processing the exception tag as an input to identify the replacement string through a search of a knowledge base associated with a programming language associated with the set of code.

11. The computer program product of claim 8, wherein comparing the exception tag and the exception string to the replacement code database comprises trawling online forums associated with a programming language associated with the set of code over an Internet system to identify the replacement string associated with the exception tag and the exception string.

12. The computer program product of claim 8, wherein the computer readable instructions further comprise instructions for:

receiving, from the robotic process automation system, the set of code with the inserted replacement string; and in response to receiving the set of code with the inserted replacement string, scanning the set of code with the inserted replacement string for new exceptions.

13. The computer program product of claim 12, wherein the computer readable instructions further comprise instructions for:

determining that no new exceptions are present in the set of code with the inserted replacement string;

storing the set of code with the inserted replacement string in a production database; and transmitting, to a computing device of a user, an indication that the set of code with the inserted replacement string is in condition to enter production.

14. The computer program product of claim 12, wherein the computer readable instructions further comprise instructions for:

determining that a new exception is present in the set of code with the inserted replacement string; and in response to determining that a new exception is present in the set of code with the inserted replacement string, transmit, to a computing device of a user, an indication that the set of code with the inserted replacement string is not in condition to enter production.

15. A computer implemented method for utilization of a robotic process automation system for functional evaluation and improvement of back end instructional constructs, said computer implemented method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving a set of code;

scanning the set of code for one or more exceptions;

identifying, from the scan, an exception of the one or more exceptions, wherein the exception comprises an exception tag and an exception string located at a first location within the set of code, wherein the exception tag includes a type of the exception and a location of the exception;

determining whether the type of the exception is a compile time error or a run time error; and in response to identifying the exception and determining whether the type of the exception is a compile time error or a run time error, transmitting the set of code and the identified exception to a robotic process automation system configured to:

compare the exception tag and the exception string to a replacement code database to identify a replacement string;

remove the exception string from the set of code at the first location; and insert the replacement string into the set of code at the first location.

16. The computer implemented method of claim 15, wherein comparing the exception tag and the exception string to the replacement code database comprises querying a relational database of known exception tags or known exception strings and paired known replacement code for each of the known exception tags or known exception strings.

17. The computer implemented method of claim 15, wherein comparing the exception tag and the exception string to the replacement code database comprises processing the exception tag as an input to identify the replacement string through a search of a knowledge base associated with a programming language associated with the set of code.

18. The computer implemented method of claim 15, wherein comparing the exception tag and the exception string to the replacement code database comprises trawling online forums associated with a programming language associated with the set of code over an Internet system to identify the replacement string associated with the exception tag and the exception string.

19. The computer implemented method of claim 15, further comprising:

receiving, from the robotic process automation system, the set of code with the inserted replacement string;

in response to receiving the set of code with the inserted replacement string, scanning the set of code with the inserted replacement string for new exceptions;

determining that no new exceptions are present in the set of code with the inserted replacement string;

storing the set of code with the inserted replacement string in a production database; and transmitting, to a computing device of a user, an indication that the set of code with the inserted replacement string is in condition to enter production.

20. The computer implemented method of claim 15, further comprising:
- receiving, from the robotic process automation system, the set of code with the inserted replacement string;
- in response to receiving the set of code with the inserted replacement string, scanning the set of code with the inserted replacement string for new exceptions;
- determining that a new exception is present in the set of code with the inserted replacement string; and
- in response to determining that a new exception is present in the set of code with the inserted replacement string, transmit, to a computing device of a user, an indication that the set of code with the inserted replacement string is not in condition to enter production.

* * * * *